US012782948B2

(12) United States Patent
El Assaad

(10) Patent No.: US 12,782,948 B2
(45) Date of Patent: Nov. 3, 2026

(54) VEHICLE, INFRASTRUCTURE COMPONENT, APPARATUS, COMPUTER PROGRAM, AND METHOD FOR A VEHICLE

(71) Applicant: VOLKSWAGEN AKTIENGESELLSCHAFT, Wolfsburg (DE)

(72) Inventor: Ahmad El Assaad, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 314 days.

(21) Appl. No.: 18/264,775

(22) PCT Filed: Feb. 9, 2022

(86) PCT No.: PCT/EP2022/053166

§ 371 (c)(1),
(2) Date: Aug. 9, 2023

(87) PCT Pub. No.: WO2022/171699

PCT Pub. Date: Aug. 18, 2022

(65) Prior Publication Data

US 2024/0111304 A1 Apr. 4, 2024

(30) Foreign Application Priority Data

Feb. 9, 2021 (EP) .................................... 21156142

(51) Int. Cl.
*G05D 1/227* (2024.01)
*G01C 21/32* (2006.01)
(Continued)

(52) U.S. Cl.
CPC ....... *G05D 1/2274* (2024.01); *G01C 21/3492* (2013.01); *G05D 1/222* (2024.01); *G05D 2105/20* (2024.01)

(58) Field of Classification Search
CPC .. G05D 1/2274; G05D 1/222; G05D 2105/20; G05D 2105/22; G05D 2107/13; G05D 2109/10; G01C 21/3492
See application file for complete search history.

(56) References Cited

U.S. PATENT DOCUMENTS

| | | | |
|---|---|---|---|
| 8,634,980 | B1 | 1/2014 | Urmson et al. |
| 9,870,001 | B1 | 1/2018 | Mangal et al. |

(Continued)

FOREIGN PATENT DOCUMENTS

| | | | | |
|---|---|---|---|---|
| CN | 108349507 | A | 7/2018 | |
| DE | 102019204943 | A1 * | 10/2020 | .......... B60W 60/001 |

(Continued)

OTHER PUBLICATIONS

Extended European Search Report; European Patent Application No. 21156142.8; Jun. 30, 2021.

(Continued)

*Primary Examiner* — Rachid Bendidi
*Assistant Examiner* — Joseph Anderson Yanoska
(74) *Attorney, Agent, or Firm* — BARNES & THORNBURG LLP

(57) ABSTRACT

A transportation vehicle, an infrastructure component, an apparatus, a computer program, and a method for a transportation vehicle to be remotely operated by a remote driver in a remote driving mode and to be operated at least partially automatically in an automated driving mode. The method includes determining driving preferences of a remote driver from the driving behavior of the remote driver, predicting information on a future traffic situation for switching from the automated driving mode to the remote driving mode, determining a predicted quality of service (pQoS) of a communication link for the remote driving mode, predicting a remote operation interval for which the transportation (Continued)

vehicle is at least operable in the remote driving mode based on the pQoS and the information on the future traffic situation, and deciding for or against a change from the automated driving mode to the remote driving mode.

29 Claims, 2 Drawing Sheets

(51) Int. Cl.

| | |
|---|---|
| ***G01C 21/34*** | (2006.01) |
| ***G05D 1/222*** | (2024.01) |
| *G05D 105/20* | (2024.01) |

(56) References Cited

U.S. PATENT DOCUMENTS

| | | | | |
|---|---|---|---|---|
| 2019/0009794 | A1 | 1/2019 | Toyoda et al. | |
| 2019/0042859 | A1 | 2/2019 | Schubert et al. | |
| 2019/0049989 | A1 | 2/2019 | Akotkar et al. | |
| 2019/0146509 | A1 | 5/2019 | Dean et al. | |
| 2019/0384994 | A1 | 12/2019 | Frossard et al. | |
| 2020/0012872 | A1 | 1/2020 | Autran | |
| 2020/0017124 | A1 | 1/2020 | Camhi et al. | |
| 2020/0139991 | A1 | 5/2020 | Kim et al. | |
| 2020/0164895 | A1 | 5/2020 | Boss et al. | |
| 2020/0192360 | A1 | 6/2020 | Zheng et al. | |
| 2020/0209875 | A1 | 7/2020 | Marzani | |
| 2020/0241526 | A1 | 7/2020 | Kim et al. | |
| 2021/0107526 | A1 * | 4/2021 | Nozaki | B60W 60/0057 |
| 2022/0075366 | A1 | 3/2022 | Blank et al. | |
| 2023/0213933 | A1 * | 7/2023 | El Essaili | G05D 1/0016 701/2 |

FOREIGN PATENT DOCUMENTS

| | | | | | |
|---|---|---|---|---|---|
| EP | 3279053 | A1 * | 2/2018 | B60W 40/09 |
| EP | 3378722 | A1 | 9/2018 | |
| WO | WO-2019180700 | A1 * | 9/2019 | G05D 1/223 |

OTHER PUBLICATIONS

International Search Report; International Patent Application No. PCT/EP2022/053166; May 3, 2022.

Office Action; Chinese Patent Application No. 202280014236.3; Mar. 13, 2026.

* cited by examiner

VEHICLE, INFRASTRUCTURE COMPONENT, APPARATUS, COMPUTER PROGRAM, AND METHOD FOR A VEHICLE

PRIORITY CLAIM

This patent application is a U.S. National Phase of International Patent Application No. PCT/EP2022/053166, filed 9 Feb. 2022, which claims priority to European Patent Application No. 21156142.8, filed 9 Feb. 2021, the disclosures of which are incorporated herein by reference in their entireties.

SUMMARY

Illustrative embodiments relate to a transportation vehicle, an infrastructure component, an apparatus, a computer program, and a method for a transportation vehicle. In particular, illustrative embodiments relate to a concept for handover of control over a transportation vehicle when switching from automated driving mode to remote driving mode.

BRIEF DESCRIPTION OF THE DRAWINGS

Disclosed embodiments will be described in more detail below with reference to the drawings, in which.

DETAILED DESCRIPTION

Figure 1:
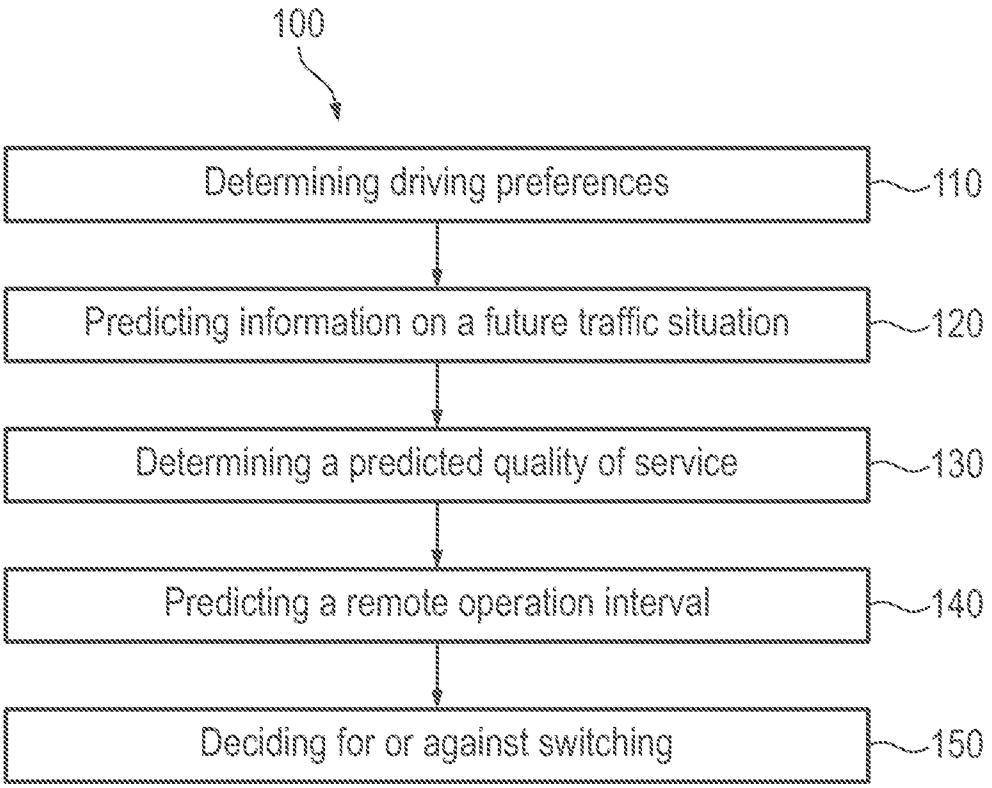
FIG. 1 illustrates a flowchart of an exemplary embodiment of a disclosed method for a transportation vehicle.

Several transportation vehicle concepts provide for operating transportation vehicles in different modes for automated and remote driving, respectively. Remote driving sometimes is referred to as "tele-operated driving (ToD)". In such concepts, transportation vehicles, e.g., are operated at times in a remote driving mode where a remote driver operates the transportation vehicle from remote and at other times in an automated driving mode where the transportation vehicle is operated at least partially automatically. In some concepts, it may be desired to switch from the automated driving mode to the remote driving mode while driving and in a safe way. The transportation vehicle, e.g., switches from the automated driving mode to the remote driving mode in so-called "deadlock situations" which the transportation vehicle cannot resolve itself. In practice, it takes resources (e.g., communication resources, human resources, etc.) every time the mode switches from the automated driving mode to the remote driving mode.

Document DE 10 2019 204943 A1 refers to a concept for teleoperated driving which provides for adjusting the teleoperated driving based on a predicted quality of service of a communication connection between a transportation vehicle and a control center.

Document EP 3 279 053 A1 refers to an operator-evaluation system for an automated transportation vehicle which includes a traffic-detector and a controller. The traffic-detector is used to determine a complexity-ranking of a traffic-scenario approached by a host-vehicle. The controller is in communication with the traffic-detector and is configured to operate the host-vehicle, depending on the complexity-ranking and a skill-ranking of an operator in an automated-mode, monitored mode, or manual mode.

Document US 2020/192360 A1 relates to a concept of determining a risk of operating a transportation vehicle in a current mode and switching modes.

Document US 2020/0139991 A1 provides a concept for switching a travel mode between a manual mode and an autonomous mode of a transportation vehicle based on a sensing signal which is indicative of a force applied to a steering wheel of the transportation vehicle.

Document US 2020/0017124 A1 provides a concept for switching an operational mode of a transportation vehicle from an autonomous mode to a manual mode and for indicating to an occupant of the transportation vehicle to assume manual control of the transportation vehicle based on an estimated reaction in advance of a condition to change the operational mode.

However, the documents remain silent about a concept for transferring control of the transportation vehicle when switching from the autonomous mode in a remote driving mode.

Hence, there may be a demand for an improved concept for transferring control of a transportation vehicle when switching from an automated driving mode to a remote driving mode of the transportation vehicle.

This demand may be satisfied by the subject-matter of the appended independent and dependent claims.

Disclosed embodiments are based on the finding that switching from an automated driving mode to a remote driving mode of a transportation vehicle is particularly safe when a traffic situation is convenient and safe for a remote driver to take over control of the transportation vehicle. Since different remote drivers may have various driving preferences, different traffic situations may be convenient and safe with respect to various driving preferences of different drivers. It is also a finding that switching from the automated driving mode to the remote driving mode takes various resources (e.g., computing power, communication resources, human resources) and may impair a driving comfort. Thus, a basic idea of the present disclosure is to avoid rapid changes of modes to at least lower a consumption of resources and impairment of the driving comfort.

Disclosed embodiments provide a method for a transportation vehicle configured to be remotely operated in a remote driving mode and to be operated at least partially automatically in an automated driving mode. The method comprises determining driving preferences of the remote driver from the driving behavior of the remote driver. Also, the method comprises predicting, based on the driving preferences, information on a future traffic situation for switching from the automated driving mode to the remote driving mode. Further, the method comprises determining a predicted quality of service (pQoS) of a communication link for the remote driving mode. The method also comprises predicting a remote operation interval for which the transportation vehicle is at least operable in the remote driving mode based on the pQoS and the information on the future traffic situation. Further, the method comprises deciding for or against a change from the automated driving mode to the remote driving mode based on the remote operation interval. The future traffic situation, e.g., is a moment or an interval where it is convenient for the remote driver to take over control of the transportation vehicle in regard to the driving preferences. The respective information on the future traffic situation, e.g., indicates a position, area, time, and/or a time interval of the future traffic situation. In other words, the information on the future traffic situation indicates where and/or when it may be convenient and/or safe for the remote driver to take over control of the transportation vehicle. The remote operation interval, e.g., indicates for how long (regarding time and/or space) the remote driving mode can be maintained on condition of a (safe) handover when it is convenient and/or safe for the remote driver to take over control of the transportation vehicle. So, the method enables a strategy for safe and also (economically) reasonable changes between the automated driving mode and the remote driving mode. Thus, the proposed method may serve to lower the consumption of resources and decrease impairment of the driving comfort. In particular, the proposed concept is applicable for transitions during driving, i.e., without stopping the transportation vehicle.

In some exemplary embodiments, predicting information on the future traffic situation comprises predicting the information on the future traffic situation based on information on a current traffic situation, information on one or more present and/or planned maneuvers of the transportation vehicle in the automated driving mode, and/or information on a planned route. The information on the current traffic situation allows, e.g., to determine whether the current traffic situation is convenient for the handover, e.g., for an immediate or soon handover of control of the transportation vehicle for switching from the automated driving mode to the remote driving mode. The information on the planned route and/or the one or more present and/or planned maneuvers allows to determine when and/or where it is convenient for the remote driver to take over control with respect to driving characteristics and/or a style of driving in the automated driving mode.

In some exemplary embodiments, deciding for or against the change from the automated driving mode to the remote driving mode comprises obtaining a threshold for the remote operation interval. Also, the method may provide for deciding for switching from the automated driving mode to the remote driving mode if the remote operation interval exceeds the threshold and deciding against switching from the automated driving mode to the remote driving mode if the remote operation interval falls short of the threshold. The threshold can be defined so as to avoid switching to the remote driving mode for an uneconomically short period of time. Also, the threshold may be at least equal to or larger than a reaction time it takes the remote driver to react for taking over control of the transportation vehicle when switching to the remote driving mode.

According to some exemplary embodiments, predicting the remote operation interval comprises obtaining information on a handover duration it takes to transfer control over the transportation vehicle when switching from the automated driving mode to the remote driving mode and predicting the remote operation interval based on the handover duration. This allows a more accurate prediction of the remote operation interval and, thus, a more valid decision for or against switching from the automated driving mode to the remote driving mode.

In some exemplary embodiments, the method further comprises determining a handover time within the remote operation interval for switching from the automated driving mode to the remote driving mode. The handover time allows to coordinate processes for switching to the remote driving mode at the transportation vehicle and at a remote control center for remote driving.

Predicting the future traffic situation may also comprise predicting the information on the future traffic situation based on a comparison of the driving preferences and one or more future traffic situations. The comparison allows a deterministic way to determine when and/or where it is safe and/or convenient to hand over control of the transportation vehicle. For example, the comparison enables to determine when and/or where to hand over the control based on a deviation of the future traffic situation from the driving preferences. For example, the hand over can be carried out where and/or when the deviation is less than a predetermined threshold. Thus, the hand over can be carried out when and/or where the traffic situation approximately corresponds to the driving behavior of the driver.

The driving preferences, e.g., comprise one or more conditions for the traffic situation for switching from the automated driving mode to the remote driving mode and predicting information on the future traffic situation, e.g., comprises predicting the information on the future traffic situation based on a comparison of the one or more conditions and one or more future traffic situations. This allows to determine multiple traffic situations for switching from the automated driving mode to the remote driving mode. In particular, this allows to determine the latest future traffic situation and select the latest future traffic situation for switching to the remote driving mode to give the remote driver as much time as possible to prepare himself or herself to take over control of the transportation vehicle.

The conditions, e.g., comprise conditions for an acceleration, a velocity of the transportation vehicle, steering angle, a road profile, and/or a distance to one or more other transportation vehicles in the environment of the transportation vehicle. The conditions, e.g., are determined based on the driving behavior of the driver and such that it is convenient for the driver to take over control of the transportation vehicle if at least one, some, or all of the conditions are fulfilled—for example, if the acceleration and the velocity of the transportation vehicle fall short of the acceleration and velocity defined by the conditions and/or if the distance to the other transportation vehicles is larger than the distance defined by the conditions. Also, the driving behavior may indicate that the driver, e.g., a new driver, is unsteady in curves. Accordingly, one of the conditions may proscribe handovers in curves. In turn, the one or more conditions may allow the handover in curves for advanced drivers.

In practice a plurality of (estimated) future traffic situations may be considered to determine the future traffic situation (suitable) for switching from the remote driving mode to the manual driving mode. This allows, e.g., to determine the most convenient and/or one or more intervals for switching from the remote driving mode to the manual driving mode.

According to some exemplary embodiments, the method further comprises causing the transportation vehicle in the automated driving mode to adapt driving parameters affecting the future traffic situation to fulfill the conditions. In this way, a convenient future traffic situation for switching from the automated driving mode to the remote driving mode may be actively created or forced.

The remote operation interval, e.g., is a time interval for which the traffic situation fulfills the one or more conditions and the pQoS allows sufficient communication via the communication link for remote driving.

According to some exemplary embodiments, deciding against switching from the automated driving mode to the remote driving mode comprises deciding for switching from the remote driving mode to a manual driving mode of the transportation vehicle. In this way, e.g., deadlock situation can be resolved by a driver in the transportation vehicle when it is not possible or reasonable to switch to the remote driving mode.

Other disclosed embodiments provide a computer program having a program code for performing at least one of the methods of the preceding claims, when the computer program is executed on a computer, a processor, or a programmable hardware component.

Further disclosed embodiments provide an apparatus comprising. The apparatus comprises one or more interfaces for communication and a data processing circuit. The data processing circuit is configured to control the one or more interfaces. Further, the data processing circuit and the one or more interfaces are configured to execute one of the methods proposed herein.

Other disclosed embodiments provide a transportation vehicle or an infrastructure component comprising the apparatus proposed herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed, or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term “or” refers to a non-exclusive or, unless otherwise indicated (e.g., “or else” or “or in the alternative”). Furthermore, as used herein, words used to describe a relationship between elements should be broadly construed to include a direct relationship or the presence of intervening elements unless otherwise indicated. For example, when an element is referred to as being “connected” or “coupled” to another element, the element may be directly connected or coupled to the other element or intervening elements may be present. In contrast, when an element is referred to as being “directly connected” or “directly coupled” to another element, there are no intervening elements present. Similarly, words such as “between”, “adjacent”, and the like should be similarly interpreted.

The terminology used herein is for the purpose of describing particular embodiments only and is not intended to be limiting of example embodiments. As used herein, the singular forms “a”, “an” and “the” are intended to include the plural forms as well, unless the context clearly indicates otherwise. It will be further understood that the terms “comprises”, “comprising”, “includes”, or “including”, when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Tele-operated driving can be deployed to implemented mobility and transport services like tele-operated parking, tele-operated taxi, and tele-operated goods transport in different automation levels. For safe deployment of tele-operated driving in combination with automated systems with different level of automation, it a challenge to perform a safe handover when switching from automated driving (i.e., from an automated driving mode) to tele-operation driving (i.e., in a remote driving mode). A handover, e.g., is necessary in so-called deadlock situations where a transportation vehicle cannot resolve a traffic situation automatically in the automated driving mode. One challenge is to provide a safe handover. Another challenge is to determine whether it is (economically) reasonable to switch to remote driving mode.

Hence, there may be a demand for an improved concept for transferring control of a transportation vehicle when switching from automated driving mode to a remote driving mode.

FIG. 1 illustrates a flowchart of an exemplary embodiment of a disclosed method 100 for a transportation vehicle configured to be remotely operated in a remote driving mode and to be operated at least partially automatically in an automated driving mode. The transportation vehicle can be a car, a bus, a truck, or the like. For the remote driving mode, the transportation vehicle may communicate with a remote control center which exhibits equipment for the remote driver to control the transportation vehicle from remote. The remote operator, thus, can have full or at least partial control over the transportation vehicle and, e.g., maneuver the transportation vehicle, accelerate, decelerate, steer, and/or control one or more functions (e.g., the electronic stability control, ESC, the anti-lock braking system, ABS, and/or the like) in the remote driving mode. Thus, the driver of the transportation vehicle may not need to maneuver the transportation vehicle himself or herself in the remote driving mode. In the remote driving mode, the transportation vehicle, e.g., monitors its environment using one or more (various) sensors (e.g., camera/s, lidar sensor/s, radar sensor/s, and/or the like) to provide the remote operator with information from the sensors, e.g., on a course of a road and/or traffic events in the environment to enable the remote operator to maneuver the transportation vehicle. In the automated driving mode, the transportation vehicle is controlled fully or partially automatically. Also, the transportation vehicle may be configured to be “manually” operated, i.e., by a (manual) driver in the transportation vehicle, in a manual driving mode.

In some scenarios, an imminent deadlock situation is predicted, e.g., in view of an upcoming construction site, or any other circumstances which the transportation vehicle cannot handle automatically in the automated driving mode. Thus, it may be desired or necessary to switch from the automated driving mode to the remote driving mode. Also, reasons other than imminent deadlock situations can make it necessary or desirable to switch from the automated driving mode to the remote driving mode. Method 100 provides a concept for determining if it is safe and (economically) reasonable to switch from the automated driving mode to the remote driving mode.

As can be seen from the flow chart, method 100 comprises determining 110 driving preferences of the remote driver from the driving behavior of the remote driver. The driving behavior can be understood as a manner of driving of the remote driver when the driver maneuvers the transportation vehicle, e.g., in the remote driving mode.

To determine the driving behavior, data related to the remote driver and to the driving behavior may be collected in the remote driving mode. Further, the data, e.g., comprises information on the transportation vehicle. The information on the transportation vehicle, e.g., indicates an acceleration (in 2D or 3D if available), speed/velocity (in 2D or 3D if available), distance to one or more other transportation vehicles, a location of the transportation vehicle, and/or a road profile and/or geometry of a road travelled by the transportation vehicle. So, the driving behavior may be obtained from the collected data. The data may also comprise information on the remote driver. The information on the remote driver, e.g., indicates a psychological state (happy, sad, angry, etc.), a health state, and/or the gender and/or age of the remote driver. This allows to associate the driving behavior with the health state and/or the psychological state and, thus, to select driving preferences for a respective remote driver in accordance with a current psychological state and/or current health state of the remote driver. This allows to obtain personalized driving preferences for different remote drivers. Also, the data may be indicative of a (minimum) reaction time of the driver to react to requests for remote driving and to take over control of the transportation vehicle. The reaction time allows to determine more precisely how long the transportation vehicle is operable in the remote driving mode, as stated in more detail later. The information on the remote driver can be retrieved from the remote control center. In some exemplary embodiments, the driving preferences are determined by the transportation vehicle. To save resources of the transportation vehicle, the driving preferences are optionally determined remote from the transportation vehicle, e.g., by an infrastructure component. In such disclosed embodiments where the driving preferences are determined by the infrastructure component, the data can be received via the transportation vehicle. This allows to omit an additional (direct) connection between the remote control center and the infrastructure component and to synchronize the information on the transportation vehicle with the information on the remote driver on the transportation vehicle. In particular, the data can be collected and transmitted with the same rate of cooperative awareness messages of the transportation vehicle. So, the rate may depend on the speed/velocity of the transportation vehicle. The higher the velocity, the higher may be the rate for a more accurate determination.

The transportation vehicle, the remote control center, and/or the infrastructure component, e.g., communicate via a communications network. The communications network may use one or more arbitrary communication technologies and/or standards to communicatively connect the transportation vehicle, the remote control center, and/or the infrastructure component. In particular, the communications network may be a mobile communications network. The (mobile) communications network may, for example, be or comprise an Orthogonal Time Frequency Space (OTFS) system or one of the Third Generation Partnership Project (3GPP)-standardized mobile communications networks. The communications network may correspond to or comprise a mobile communication system of the 4th or 5th Generation (4G, 5G) and may use mm-Wave technology. The communications network may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communications networks with different standards, for example, a Worldwide Interoperability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

The infrastructure component, e.g., comprises or corresponds to a cloud system in the mobile communications network. In some exemplary embodiments, the collected data is processed using an appropriately trained artificial intelligence (AI) algorithms for determining the driving behavior and/or the driving preferences from the collected data.

The driving preferences, e.g., are indicative of a function, a mean, a maximum, or a minimum value for the velocity, a steering angle, the acceleration, and/or the distance to other transportation vehicles. The driving preferences can be defined such that they indicate under which circumstances it is convenient for the remote driver to take over control of the transportation vehicle. The driving preferences can be also indicative of “driving capabilities” of the remote driver which represent circumstances under which the remote driver is able to take over control of the transportation vehicle safely. Although the present disclosure merely refers to the velocity, the steering angle, the acceleration, and/or the distance to other transportation vehicles, it is noted that also one or more other or further criteria may be used to determine and/or represent the driving preferences.

Optionally, the remote driver can also specify or define the driving behavior by himself using a user interface Also, method 100 comprises predicting 120, based on the driving preferences, information on a future traffic situation for switching from the automated driving mode to the remote driving mode. In context of the present disclosure, the (future) traffic situation can be understood as a momentary or temporary scene that the transportation vehicle “experiences” or to which the transportation vehicle is exposed. Accordingly, the future traffic situation for switching from the automated driving mode to the remote driving mode can be understood as a scene for which it may be convenient for the remote driver to take over control with respect to the driving preferences. The information on the future traffic situation, e.g., is indicative of a time and/or a location of the future traffic situation convenient/suitable for switching from the automated driving mode to the remote driving mode with regard to the driving preferences of the remote driver. The future traffic situation, e.g., is convenient/suitable for switching from the automated driving mode to the remote driving mode with regard to the driving preferences if the future traffic situation is reconcilable with the driving preferences. This, e.g., is the case if/when the transportation vehicle’s acceleration, steering angle, velocity, and/or distance to other transportation vehicles in the future traffic situation differs no more than by a predefined deviation from the driving preferences. To determine the information on the future traffic situation, a plurality of estimated future traffic situations and/or an estimated future development of the traffic situation of the transportation vehicle may be compared to the driving preferences of the remote driver. In practice, the information on the future traffic situation may be indicative of a time, a time interval, a position, and/or an area/road section where and/or when it is safe and/or convenient for the remote driver to take over control of the transportation vehicle.

Predicting 120 information on the future traffic situation may comprise predicting the information on the future traffic situation based on information on a current traffic situation, information on one or more present and/or planned maneuvers of the transportation vehicle in the automated driving mode, and/or information on a planned route.

For example, the current traffic situation indicates that, based on the driving preferences, it may be convenient for the driver to take over the control soon or within a certain time as of now. So, the future traffic situation may be a future traffic situation within the certain time as of now. Accordingly, if the current traffic situation is convenient for switching from the automated driving mode to the remote driving mode, the information on the future traffic situation may be indicative of a certain time interval as of now for switching from the remote driving mode to the manual driving mode. To monitor the current traffic situation, the transportation vehicle may be equipped with one or more environmental sensors (e.g., Lidar sensor, radar sensor, camera, ultra-sonic sensor, etc.).

The information on the on one or more present and/or planned maneuvers of the transportation vehicle in the automated driving mode, and/or information on a planned route indicate when and/or where in the future it may be convenient for the remote driver to take over control of the transportation vehicle. The planned route, e.g., is a path or a plurality of trajectories which the transportation vehicle will follow. The information on the planned route may be indicative of a road profile, road conditions, a course of the road, and/or locations where the transportation vehicle accelerates, turns, decelerates, or stops. So, the planned route as well as the present and/or planned maneuvers may indicate when and/or where the transportation vehicle accelerates, brakes, turns, etc. It is a finding that it is inconvenient for the remote driver to take over the control while the transportation vehicle accelerates, brakes, and/or turns. Accordingly, the future traffic situation may be a situation where the transportation vehicle does not brake, accelerate, and/or change the direction of the transportation vehicle. Thus, the information on the future traffic situation may indicate where and/or when the transportation vehicle does not accelerate, brake, and/or turn according to the one or more present and/or planned maneuvers of the transportation vehicle in the automated driving mode, and/or the information on the planned route.

Further, method 100 comprises determining 130 a predicted quality of service (pQoS) of a communication link for the remote driving mode. The pQoS is, e.g., determined from a history of a quality of service (QoS) of the communication link and/or a location of the transportation vehicle. For example, it is known from the history that in preceding situations where the transportation vehicle entered a tunnel the QoS and/or the communication link worsens such that remote driving is not possible for a time in the tunnel. Thus, the pQoS can be determined from the location of the transportation vehicle and the history. The pQoS also may be determined in another way, e.g., from a past development of the QoS. The pQoS, e.g., allows to predict an area, a time, and/or a duration for which a quality of service (e.g., data rate, latency, etc.) is sufficient for remote driving.

Method 100 further comprises predicting 140 a remote operation interval for which the transportation vehicle is at least operable in the remote driving mode based on the pQoS and the information on the future traffic situation. The remote operation interval can be understood as an interval after switching from automated driving mode to remote driving mode in accordance with the information on the future traffic situation and for which the communication link (continuously) has sufficient QoS according to the pQoS.

Depending on the scenario, the information on the future traffic situation or the pQoS may define when and/or where the remote operation interval starts. In some scenarios, the information on the future traffic situation indicates when and/or where it is safe and/or convenient for the remote driver to take over control of the transportation vehicle while the pQoS is sufficient for remote driving. In such a scenario, the information on the future traffic situation defines when and/or where the remote operation interval starts. In other scenarios, the pQoS indicates when and/or where the pQoS becomes sufficient for remote driving while it is safe and/or convenient for the remote driver to take over control of the transportation vehicle. In such a scenario, the pQoS defines when and/or where the remote operation interval starts. Also, the pQoS indicates when and/or where the pQoS becomes insufficient for remote driving and/or for (at least) how long the pQoS is sufficient for remote driving. So, the pQoS may indicate when and/or where the remote operation interval ends. The remote operation interval, e.g., is a period of time or a distance for which the transportation vehicle is operable in the remote driving mode.

Method 100 also comprises deciding 150 for or against switching from the automated driving mode to the remote driving mode based on the remote operation interval. For this, the remote operation interval may be compared to a threshold. The threshold, e.g., is a time interval or distance threshold. If the remote operation interval exceeds or is equal to the threshold it is decided for switching or changing from the automated driving mode to the remote driving mode. Otherwise, if the remote operation interval falls short of the threshold, it is decided against switching/changing from the automated driving mode to the remote driving mode. Optionally, it is also decided against switching from the automated driving mode to the remote driving mode if the remote operation interval is equal to the threshold. The time interval and/or the distance threshold may be chosen such that the remote driver is able to react to the handover of control over the transportation vehicle, to resolve a predicted deadlock situation, and/or such that it is economically reasonable to switch to the remote driving mode for the chosen time interval. The threshold, e.g., is a time interval of ten or a few tens of seconds, or of one or few minutes. Optionally, the time interval can be shorter or longer.

The decision for or against switching may then be communicated to the transportation vehicle and the remote control center to orchestrate or avoid switching from the automated driving mode to the remote driving mode.

The above will be explained in more detail below with reference to an exemplary scenario. In the automated driving mode, the transportation vehicle may not be able to maneuver itself automatically when entering and travelling around in an underground garage. So, it is, e.g., predicted that a deadlock situation occurs when the transportation vehicle enters and travels around in an underground garage. In an entry of the underground garage, the QoS may be still sufficient while inside the underground garage, the QoS may become insufficient for remote driving and the driver in the transportation vehicle may need to take over control. Accordingly, the pQoS may indicate a point in time or a position when or where the QoS becomes insufficient when entering or travelling around in the underground garage. In this exemplary scenario, the information on the future traffic situation may suggest switching from the automated driving mode to the remote driving mode on a straight before turning into the entry of the underground garage, as it is inconvenient and/or unsafe for the remote driver to take over control afterwards, e.g., when the transportation vehicle turns into the entry, according to the driving preferences of the remote driver. Accordingly, the remote operation interval is the time interval or (road) section from where or when the transportation vehicle switches to the remote driving mode on the straight to when or where the QoS is assumed to become insufficient. The remote operation interval may be a time interval of only a few seconds before the QoS becomes insufficient and driver in the transportation vehicle takes over control in the underground garage. Such rapid changes of modes may be disturbing for the driver in the transportation vehicle and uneconomical in view of resources (computing power, human resources, time, etc.) for switching from the automated driving mode to the remote driving mode. Hence, the transportation vehicle may desist from switching from the automated driving mode to the remote driving mode for the remote operation interval. Instead, the transportation vehicle may switch from the automated driving mode to the manual driving mode, where the driver in the transportation vehicle controls it, to save resources for additional mode changes. In other scenarios, the remote operation interval may be longer and it is decided for switching from the automated driving mode to the remote driving mode.

It is noted that the proposed concept may be also applied in other scenarios where the transportation vehicle is operable in the remote driving mode for a limited time interval or (road) section.

In some exemplary embodiments, predicting 140 the remote operation interval also comprises obtaining information on a handover duration it takes to transfer control over the transportation vehicle in the change from the automated driving mode to the remote driving mode and predicting the remote operation interval based on the handover duration. This duration, e.g., is indicative of a communication and/or processing latencies in switching from the automated driving mode to the remote driving mode. Also, the handover duration may be indicative of a duration which the remote driver needs to react and to take over the control over the transportation vehicle. Regarding the above exemplary scenario, the handover duration, e.g., is subtracted from the time interval or (road) section from where or when the transportation vehicle switches to the remote driving mode to when or where the QoS is assumed to become insufficient. Thus, the remote operation interval more accurately indicates the time interval and/or road section when and/or where the remote driver controls the transportation vehicle. This allows to better weigh/decide/determine whether it is reasonable to switch from the automated driving mode to the remote driving mode.

As laid out previously, the driving preferences can comprise one or more conditions for the future traffic situation and predicting 120 information on the future traffic situation may accordingly comprise predicting the information on the future traffic situation based on a comparison of the one or more conditions and one or more future traffic situations. The conditions may prohibit switching in predefined traffic situations, e.g., while the transportation vehicle is going through a curve, a construction site, and/or when the transportation vehicle is in other complex or challenging situations. Optionally, the conditions correspond to or comprise conditions for the acceleration, the deceleration, the velocity of the transportation vehicle, a steering angle, the road profile, and/or the distance to one or more other transportation vehicles in the environment of the transportation vehicle and, e.g., are defined such that it is convenient and/or safe for the remote driver to take over control of the transportation vehicle if one, multiple, or all of the conditions are fulfilled for a future traffic situation. The conditions, e.g., are indicative of respective ranges and/or thresholds for the acceleration, the deceleration, the velocity, and/or the distance. The thresholds may be expressed by:

a maximum speed bound;

a maximum acceleration bound; and/or a minimum bound for a distance to one or more other transportation vehicles in the environment of the transportation vehicle.

The conditions may be fulfilled for a future traffic situation if the acceleration, the deceleration, and/or the velocity fall short of and/or the distance exceeds the respective threshold in the future traffic situation.

The driving preferences may be classified for remote driving in a look-up table and dependent on the location, road profile, the psychological state, the health state and on the gender and/or age of the remote driver. Thus, various driving preferences can be selected for a remote driver based on his or her gender, age, and/or his or her current psychological state and/or current health state. Also, the driving behavior and the driving preferences can be continuously updated in the remote driving mode based on further collected data, information on the remote driver, and/or information on the transportation vehicle.

Accordingly, the remote operation interval may be a time interval for which the future traffic situation fulfills the one or more conditions and the pQoS allows sufficient communication via the communication link for remote driving to provide a safe and seamless handover.

In some scenarios, the conditions are not expected to be met before the deadlock situation or other reasons for switching to the remote driving mode occur, e.g., since the transportation vehicle in the automated driving mode generally drives faster and/or with less distance to other transportation vehicles than it is reconcilable with the driving preferences of the driver in the transportation vehicle. This, e.g., happens when the transportation vehicle travels in a platoon of interconnected transportation vehicles driving automatically (platooning). Therefore, the proposed concept may provide for causing the transportation vehicle in the automated driving mode to adapt driving parameters affecting the future traffic situation to fulfill the conditions. In this way, the transportation vehicle, e.g., is caused to leave the platoon and increase the distance to other transportation vehicles. The driving parameters, e.g., are indicative of parameters affecting the velocity, the acceleration, the deceleration, a travel direction, steering angle, and/or the like.

In practice, multiple future traffic situations or an interval of future traffic situations may be save and/or convenient for switching from the automated driving mode the remote driving mode.

To coordinate the transportation vehicle and the remote control center, the proposed concept may also provide for determining a handover time and/or a handover place for switching from the automated driving mode to the remote driving mode. Thus, the remote control center and the transportation vehicle can coordinate their timing for switching from the automated driving mode to the remote driving mode using the handover time and/or handover place. The transportation vehicle, e.g., gives up and the remote control center takes over the control of the transportation vehicle at the handover time and/or the handover place.

To give the remote driver as much time as possible to react and prepare for taking over control of the transportation vehicle, the handover time and/or the handover place may be indicative of the latest future traffic situation which is suitable for switching from the automated driving mode to the remote driving mode.

The proposed concept can be implemented in the transportation vehicle or an infrastructure component (e.g., an external server or cloud system), i.e., method 100 may be carried out by the transportation vehicle or the infrastructure component.

The proposed concept may be also implemented in a computer program or an apparatus.

Figure 2:
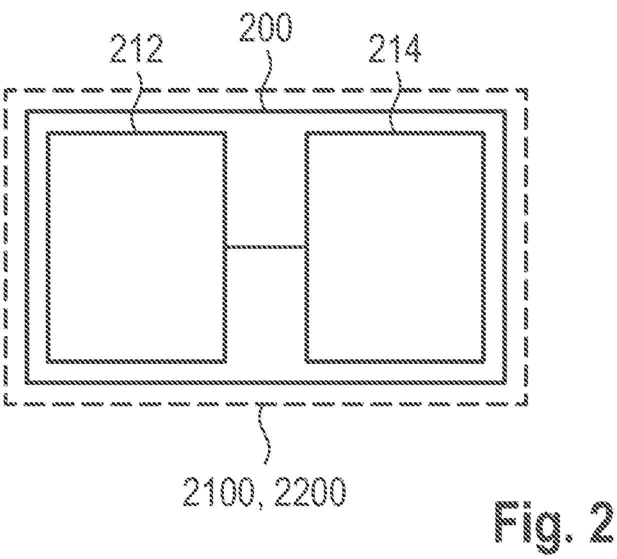
FIG. 2 schematically illustrates a block diagram of an exemplary embodiment of a disclosed apparatus.

FIG. 2 illustrates a block diagram schematically illustrating an exemplary embodiment of an apparatus 200 for implementing the proposed concept.

Apparatus 200 comprises one or more interfaces 212 for communication and a data processing circuit 214 configured to control the one or more interfaces 212. The data processing circuit 214 and the one or more interfaces 212 are configured to execute one of the methods described herein.

In disclosed embodiments, the one or more interfaces 212 may correspond to any method or mechanism for obtaining, receiving, transmitting, or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 212 may comprise components to enable in accordance with an exemplary embodiment of method 100 communication for receiving information on the driving behavior of the remote driver and/or on information indicative of the pQoS and/or QoS. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 212 may be coupled to one or more antennas, which may correspond to any transmit and/or receive antennas, such as horn antennas, dipole antennas, patch antennas, sector antennas etc. In some examples the one or more interfaces 212 may serve the purpose of transmitting the decision for or against switching from the automated driving mode to the remote driving mode to the transportation vehicle and the remote control center.

As shown in FIG. 2 the one or more interfaces 212 are coupled to the data processing circuit 214 of the apparatus 200. In disclosed embodiments the communication circuit 214 may be implemented using one or more processing units, one or more processing devices, any method or mechanism for processing, such as a processor, a computer or a programmable hardware component being operable with accordingly adapted software. In other words, the described functions of the data processing circuit 214 may as well be implemented in software, which is then executed on one or more programmable hardware components. Such hardware components may comprise a general-purpose processor, a Digital Signal Processor (DSP), a micro-controller, etc.

As indicated by dashed lines, apparatus 200 is optionally implemented in a transportation vehicle 2100, e.g., in the above described transportation vehicle.

Optionally, the proposed concept is implemented in an infrastructure component 2200 remote from the transportation vehicle. Respectively, the method 100 may be executed on a data processing circuit (of the infrastructure component) remote from the transportation vehicle.

Some of the above described features are described hereinafter with reference to an exemplary application of the proposed concept.

Figure 3:
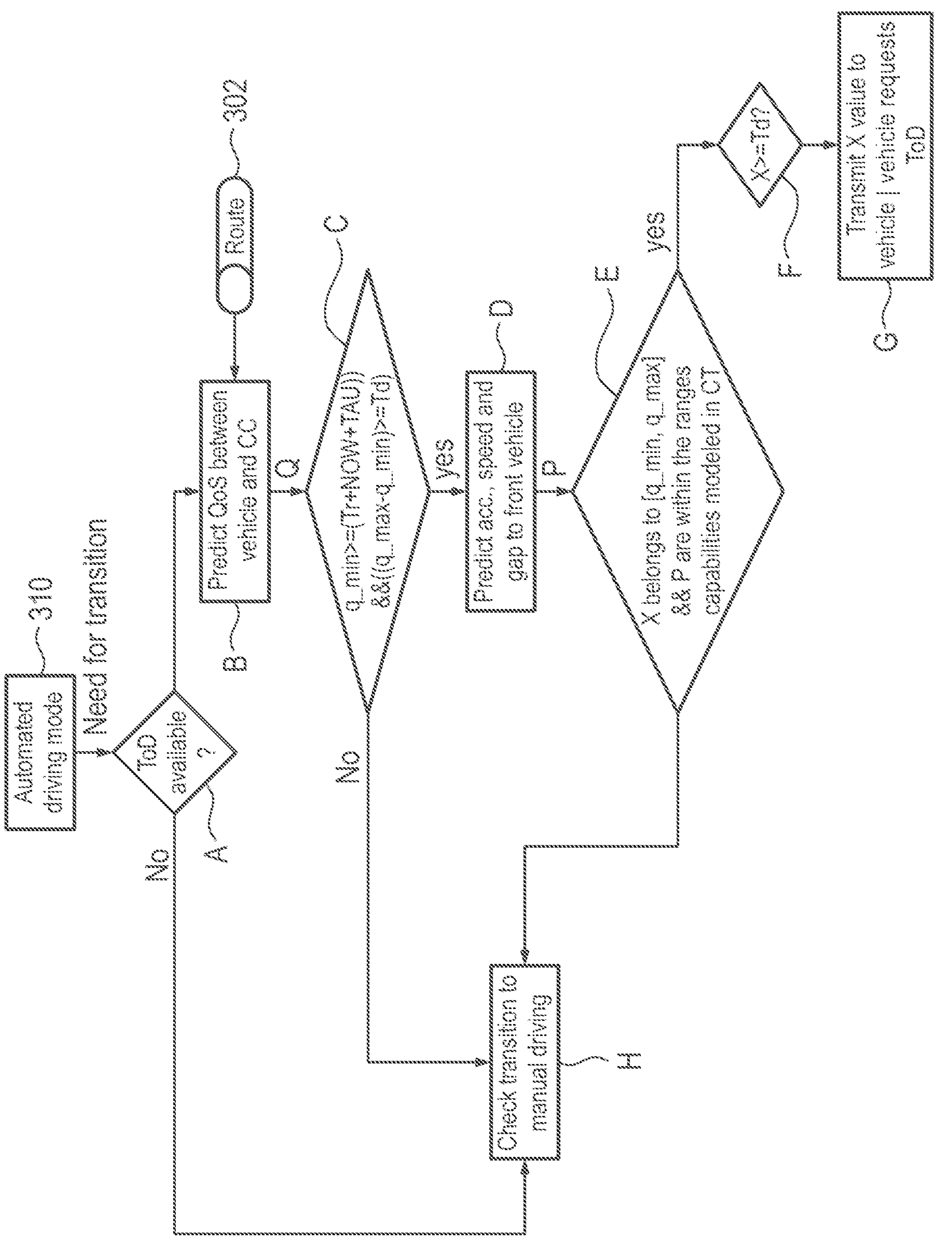
FIG. 3 schematically illustrates a flow chart for an exemplary application of the proposed concept.

FIG. 3 illustrates a flow chart schematically illustrating an application of the proposed concept.

The application described with reference to FIG. 3 may be (partially) implemented in an infrastructure component and/or the transportation vehicle. In the application described below, the proposed concept is implemented in an (remote) infrastructure component communicatively coupled to the transportation vehicle and/or a remote control center for operating the transportation vehicle from remote.

As can be seen from the flow chart, the transportation vehicle may be operated in an automated driving mode 310 in accordance with a predefined operational design domain (ODD). Then, a reason for changing the mode may occur. The reason, e.g., relates to a predicted imminent deadlock situation or a defect of the transportation vehicle.

In operation at A, it is determined whether tele-operated driving (ToD) is available. For this, the infrastructure component checks whether respective equipment for remote driving is operational and/or whether the communication link can be established. If not, operation at H may be executed where it is determined whether a transition to the manual driving mode is possible. If so, the infrastructure component may instruct the transportation vehicle to switch to the manual driving mode. Otherwise, if ToD is available, operation at B may follow which comprises determining 130 the pQoS. For this, a planned route 302 of the transportation vehicle may be used. The planned route 302, e.g., indicates a path which the transportation vehicle will follow. Together with information on a spatial distribution of the QoS, the planned route allows to determine for the pQoS where and/or when the QoS is sufficient and/or when and/or where the QoS is insufficient. The information on the spatial distribution, e.g., is obtained from a history of the QoS with respect to a respective location of the transportation vehicle.

The pQoS allows to predict a time interval Q for which a communication link between the transportation vehicle and the remote control center can be established and for which the communication link provides a sufficient QoS. The time interval Q, e.g., is specified by $Q=[q\_max-q\_min]$, wherein q_max denotes a point in time until which the QoS of the communication link is sufficient for remote driving according to the pQoS and q_min is indicative of the earliest point in time at which the communication link can be established. q_min, e.g., is specified by $q\_min \geq Tr+NOW+TAU$, wherein Tr denotes a reaction latency of the remote control center for reacting on request for remote driving, NOW denotes the current time, and TAU denotes a communication latency for switching from the automated driving mode to the remote driving mode. In some exemplary embodiments, Tr may also comprise a reaction time of the remote driver.

In a subsequent operation at C, the time interval Q is compared to a threshold Td indicative of a desired minimum period of time for which the transportation vehicle is to be operated in the remote driving mode in case of switching to the remote driving mode. Td is at least equal or larger than a reaction time it takes the remote driver to take over control of the transportation vehicle when switching to the remote driving mode. In practice, Td may be larger than the reaction time and, e.g., is equal to a predefined interval for which it is economically reasonable and/or convenient for the driver in the transportation vehicle to operate the transportation vehicle in the remote driving mode. If Q is smaller than Td, then operation at H follows. Otherwise, if Q is equal to or larger than Td, operation at D follows.

In operation at D, values P for acceleration, speed/velocity of the transportation vehicle, and/or its distance to one or other transportation vehicles are determined using predefined motion models and/or information on the route 302 and/or on a current traffic situation to predict information (e.g., time and/or place) on one or more future traffic situations and a future traffic situation for switching to the remote driving mode based on driving preferences CT and the values P. The information on the current traffic situation, e.g., comprises information on a current acceleration (2D or 3D if available), speed/velocity (2D or 3D if available), location of the transportation vehicle, and/or its current distance to one or more other transportation vehicles. Also, information on a level of automation in the automated driving mode may be used for determining future traffic situations.

The driving preferences CT, e.g., are determined in as described herein. As described above, the driving preferences, e.g., are indicative of ranges for the values P (acceleration, speed/velocity of the transportation vehicle, and/or its distance to one or other transportation vehicles) in the future traffic situations. Also, the driving preferences may depend on a current age, psychological and/or health state of the remote driver and/or his or her gender.

Then, in a subsequent operation at E, it is determined, based on the information on the future traffic situation and Q, whether a remote operation interval X exists which is within Q and, for which the values P are within the ranges defined by the driving preferences. If not, operation at H will follow and the transportation vehicle may switch from the automated driving mode to the manual driving mode. If such a remote operation interval X exists, operation at F will follow where it is checked whether remote operation interval X is larger than Td. If not, operation at H may follow and the transportation vehicle may switch from the automated driving mode to the manual driving mode. If X is larger than Td, X is provided to the transportation vehicle and the transportation vehicle orchestrates switching from the automated driving mode to the remote driving mode in accordance with X in operation at G.

The skilled person having benefit from the present disclosure will appreciate that for or in addition to the times or durations (e.g., X, Td, Q) mentioned herein, alternatively or additionally, locations, areas, and/or road sections may be used for a location-based handover.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

LIST OF REFERENCE SIGNS

100 method for a transportation vehicle
110 determining driving preferences
120 predicting information on a future traffic situation
130 determining a pQoS
140 predicting a remote operation interval
150 deciding for or against switching
200 apparatus
212 one or more interfaces
214 data processing circuit
302 planned route
310 automated driving mode
2100 transportation vehicle
2200 infrastructure component
A-H operations

The invention claimed is:

1. A method for a transportation vehicle configured to be remotely operated by a remote driver in a remote driving mode and to be operated, at least partially, automatically in an automated driving mode, the method comprising:

monitoring a driving behavior of the remote driver;

determining driving preferences of the remote driver based on the driving behavior of the remote driver;

predicting, based on the driving preferences of the remote driver, information on a future traffic situation that potentially requires switching from the automated driving mode to the remote driving mode;

determining a predicted quality of service (pQoS) of a communication link in the future for remote driving in the remote driving mode based on the future traffic situation;

predicting a remote operation interval for which the transportation vehicle is at least operable in the remote driving mode based on the determined pQoS and the information on the future traffic situation, wherein the future traffic situation indicates a moment in time or a time interval at or during which the remote driver controls the transportation vehicle based on the remote driver's driving preferences, wherein the driving preferences of the remote driver comprise one or more transportation vehicle specific conditions required for the future traffic situation for switching from the automated driving mode to the remote driving mode, wherein information on the future traffic situation indicates a position, area, time, and a duration interval of time or space during which the remote driver has control of the transportation vehicle such that the remote operation interval for the future traffic situation and the pQoS enable sufficient communication via the communication link to switch to and maintain the remote driving mode without stopping the transportation vehicle; and switching from the automated driving mode to the remote driving mode based on the predicted remote operation interval such that the transportation vehicle is switched to the remote driving mode only if the determined pQoS and the information on the future traffic situation indicate that the determined pQoS for the predicted remote operation interval would be achieved for the duration of the predicted remote operation interval based on the determined pQoS and the information on the future traffic situation.

2. The method of claim 1, wherein the prediction of information on the future traffic situation comprises predicting the information on the future traffic situation based on information on a current traffic situation, information on one or more present and/or planned maneuvers of the transportation vehicle in the automated driving mode, and/or information on a planned route.

3. The method of claim 1, wherein switching from the automated driving mode to the remote driving mode based on the predicted remote operation interval comprises:

obtaining a minimal threshold for the pQoS for supporting the predicted remote operation interval; and switching from the automated driving mode to the remote driving mode in response to the predicted remote operation interval being below the minimal threshold.

4. The method of claim 1, wherein predicting the remote operation interval comprises:

obtaining information on a handover duration required to transfer control of the transportation vehicle to switch from the automated driving mode to the remote driving mode; and predicting the remote operation interval based on the obtained handover duration.

5. The method of claim 1, further comprising determining a handover time and/or a handover place within the predicted remote operation interval for switching from the automated driving mode to the remote driving mode.

6. The method of claim 1, wherein the predicting information on the future traffic situation comprises predicting the information on the future traffic situation based on a comparison of the driving preferences of the remote driver and one or more future traffic situations.

7. The method of claim 1, wherein the prediction of information on the future traffic situation comprises predicting the information on the future traffic situation based on a comparison of the one or more required transportation vehicle specific conditions and the one or more future traffic situation.

8. The method of claim 7, wherein the one or more transportation vehicle specific conditions comprise conditions for an acceleration, a velocity of the transportation vehicle, a road profile, and/or a distance to one or more other transportation vehicles in the environment of the transportation vehicle.

9. The method of claim 7, further comprising causing the transportation vehicle, in the automated driving mode, to adapt transportation vehicle driving parameters affecting the future traffic situation to fulfill the one or more transportation vehicle specific conditions.

10. The method of claim 7, wherein the remote operation interval is a time interval for which the future traffic situation fulfills the one or more transportation vehicle specific conditions and the pQoS enables sufficient communication via the communication link for remote driving by the remote driver in the remote driving mode.

11. The method of claim 1, wherein the switching from the automated driving mode further comprises switching from the remote driving mode to a manual driving mode of the transportation vehicle if the determined pQoS and the information on the future traffic situation indicate that the determined pQoS for the predicted remote operation interval would not be achieved based on the determined pQoS and the information on the future traffic situation.

12. A computer readable medium including a computer program having a program code for performing the method of claim 1, when the computer program is executed on a computer, a processor, or a programmable hardware component.

13. The method of claim 1, wherein the method further comprises collecting information on a current traffic situation is collected on the transportation vehicle using one or more environmental sensors.

14. The method of claim 1, wherein the predicting, based on the driving preferences of the remote driver, of information on the future traffic situation that potentially requires switching from the automated driving mode to the remote driving mode is performed using a predefined motion model.

15. An apparatus comprising:

one or more interfaces for communication; and a data processing circuit configured to control the one or more interfaces, wherein the data processing circuit and the one or more interfaces are configured to:

monitor a driving behavior of a remote driver, remotely operate a transportation vehicle by the remote driver in a remote driving mode, and operate the transportation vehicle at least partially automatically in an automated driving mode, wherein the data processing circuit and the one or more interfaces are further configured to:

determine driving preferences of the remote driver based on the driving behavior of the remote driver, predict, based on the driving preferences of the remote driver, information on a future traffic situation that potentially requires switching from the automated driving mode to the remote driving mode, determine a predicted quality of service (pQoS) of a communication link for the remote driving mode, predict a remote operation interval for which the transportation vehicle is at least operable in the remote driving mode based on the determined pQoS and the information on the future traffic situation, wherein the future traffic situation indicates a moment in time or a time interval at or during which the remote driver controls the transportation vehicle based on the remote driver's driving preferences, wherein the driving preferences of the remote driver comprise one or more transportation vehicle specific conditions required for the future traffic situation for switching from the automated driving mode to the remote driving mode, wherein information on the future traffic situation indicates a position, area, time, and a duration interval of time or space during which the remote driver has control of the transportation vehicle such that the remote operation interval for the future traffic situation and the pQoS enable sufficient communication via the communication link to switch to and maintain the remote driving mode without stopping the transportation vehicle; and switch from the automated driving mode to the remote driving mode based on the predicted remote operation interval such that the transportation vehicle is switched to the remote driving mode only if the determined pQoS and the information on the future traffic situation indicate that the determined pQoS for the predicted remote operation interval would be achieved for the duration of the predicted remote operation interval based on the determined pQoS and the information on the future traffic situation.

16. A transportation vehicle comprising the apparatus of claim 15.

17. An infrastructure component comprising the apparatus of claim 15.

18. The apparatus of claim 15, wherein the prediction of the information on the future traffic situation comprises predicting the information on the future traffic situation based on information on a current traffic situation, information on one or more present and/or planned maneuvers of the transportation vehicle in the automated driving mode, and/or information on a planned route.

19. The apparatus of claim 15, wherein the decision for or against switching from the automated driving mode to the remote driving mode includes obtaining a minimal threshold for the pQoS for supporting the remote operation interval, and switching from the automated driving mode to the remote driving mode in response to the remote operation interval being below the minimal threshold.

20. The apparatus of claim 15, wherein the data processing circuit and the one or more interfaces are further configured to predict the remote operation interval by:

obtaining information on a handover duration required to transfer control of the transportation vehicle to switch from the automated driving mode to the remote driving mode; and predicting the remote operation interval based on the obtained handover duration.

21. The apparatus of claim 15, wherein the data processing circuit and the one or more interfaces are further configured to determine a handover time and/or a handover place within the predicted remote operation interval for switching from the automated driving mode to the remote driving mode.

22. The apparatus of claim 15, wherein the prediction of information on the future traffic situation comprises predicting the information on the future traffic situation based on a comparison of the driving preferences of the remote driver and one or more future traffic situations.

23. The apparatus of claim 15, wherein the prediction of information on the future traffic situation comprises predicting the information on the future traffic situation based on a comparison of the one or more required transportation vehicle specific conditions and the one or more future traffic situation.

24. The apparatus of claim 23, wherein the one or more transportation vehicle specific conditions comprise conditions for an acceleration, a velocity of the transportation vehicle, a road profile, and/or a distance to one or more other transportation vehicles in the environment of the transportation vehicle.

25. The apparatus of claim 24, wherein the data processing circuit and the one or more interfaces are further configured to cause the transportation vehicle, in the automated driving mode, to adapt transportation vehicle driving parameters affecting the future traffic situation to fulfill the one or more transportation vehicle specific conditions.

26. The apparatus of claim 24, wherein the remote operation interval is a time interval for which the future traffic situation fulfills the one or more conditions transportation vehicle specific conditions and the pQoS enables sufficient communication via the communication link for remote driving by the remote driver in the remote driving mode.

27. The apparatus of claim 15, wherein the switching from the automated driving mode further comprises switching from the remote driving mode to a manual driving mode of the transportation vehicle if the determined pQoS and the information on the future traffic situation indicate that the determined pQoS for the predicted remote operation interval would not be achieved based on the determined pQoS and the information on the future traffic situation.

28. The apparatus of claim 15, wherein the collection of information on a current traffic situation is collected on the transportation vehicle using one or more environmental sensors.

29. The apparatus of claim 15, wherein the prediction, based on the driving preferences of the remote driver, of information on the future traffic situation that potentially requires switching from the automated driving mode to the remote driving mode is performed using a predefined motion model.

* * * * *